Figures 1, 2:
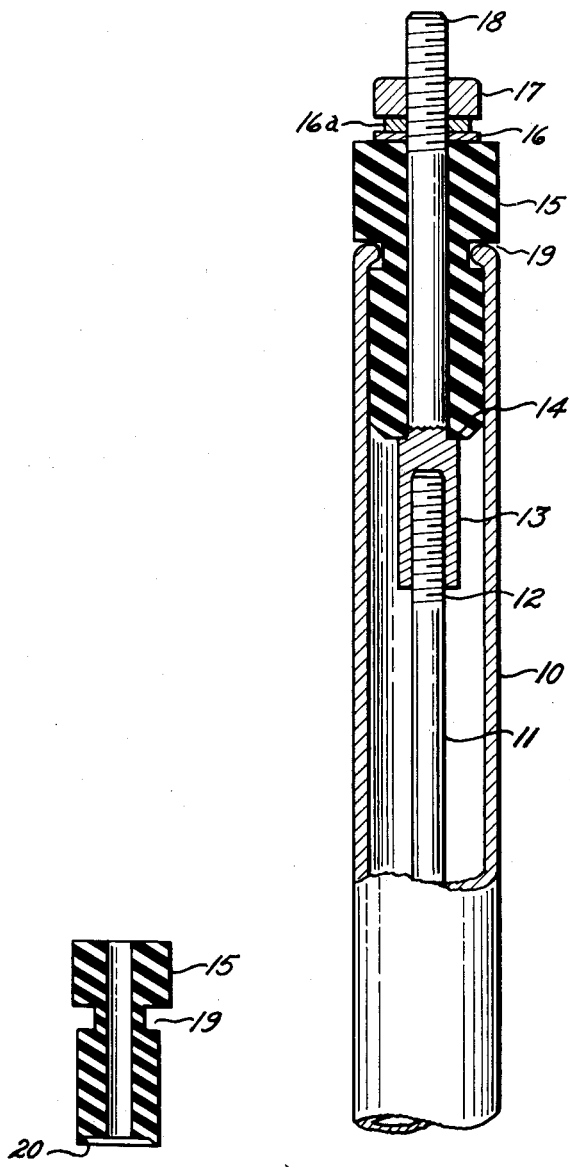

INVENTORS
OWEN O. FIET & RICHARD H. WRIGHT

United States Patent Office 2,958,721
Patented Nov. 1, 1960

2,958,721
R.F. CONSTANT IMPEDANCE END SEAL

Owen O. Fiet, Redondo Beach, Calif., and Richard H. Wright, Collingswood, N.J., assignors to the United States of America as represented by the Secretary of the Air Force Filed May 20, 1957, Ser. No. 660,433

2 Claims. (Cl. 174—77)

This invention relates to transmission lines and more particularly to an end seal for a pressurized, gas filled transmission line which provides an insulated connection to an inner conductor of the transmission line.

The pressurization of high frequency microwave transmission systems is utilized to protect the system against air leakage, moisture and water vapor. The maximum power that a unit will accommodate without voltage breakdown depends upon a maintenance of the pressure in the system. Corrosion of metallic parts, and the growth of fungi increase the loss in microwave systems; however, both of these conditions are controlled by pressurization of a sealed system.

A constant characteristic impedance of a transmission line is necessary and is usually varied by utilizing various inner conductors in the transmission line. The end seal of a pressurized gas filled transmission line should aid in providing the constant characteristic impedance for a particular unit, provide insulation between the inner conductor and outer conductor, and maintain the spacing between said conductors.

In the past, end seals have been made of glass or ceramic materials to provide the insulation; however, these materials have a relatively high loss and are not suitable for the maintenance of a constant characteristic impedance. Furthermore, severe limitations are placed on the mode of manufacture while the end result is a frangible item.

It is an object of this invention, therefore, to provide an end seal for a pressurized gas filled transmission line with a constant characteristic impedance.

It is a further object of this invention to provide an end seal for a gas filled coaxial transmission line which is very sturdy and provides a tight seal against the leakage of the pressurized gases.

Another object of the invention involves the production of a deformable end seal that may be easily and economically manufactured by means of standard manufacturing processes.

A still further object of the invention involves the provision of an end seal which can be adapted for any size line for constant characteristic impedance.

These and other advantages, features and objects of the invention will become more apparent from the following description taken in connection with the illustrative embodiments in the accompanying drawings, wherein:

Figure 1 represents an assembly of an end seal portion of a pressurized gas filled transmission line; and Figure 2 is a cross section of an alternate embodiment of the insulator.

In the assembly shown in Figure 1, 10 represents the outer cylindrical conductor of a coaxial line while 11 represents the inner conductor. Conductor 11 has an externally threaded end portion 12 to which an internally threaded extension 13 is attached. Extension 13 provides for the mounting of the seal and has a shoulder 14 for limiting the movement of hollow end seal plug 15 along extension 13. A washer 16, lock washer 16a and nut 17 are mounted on externally threaded end portion 18 of extension 13. End portion 18 may be of a configuration other than that shown in order to provide for various external connections to suit particular requirements.

The hollow insulating plug 15 is of generally cylindrical shape with an annular groove 19 on its outer periphery into which the end of outer conductor 10 is crimped or swaged. The diameter of the plug 15 within the outer conductor is smaller than that outside said conductor so that the plug in the final assembly will be a continuance of the smooth contour of outer conductor 10.

A tight fit between extension 13, plug 15 and outer conductor 10 is provided; however, for preventing the leakage of the pressurized gas, the crimp at 19 plus the compressing action to which plug 15 is subjected due to the pressure exerted by shoulder 14, nut 17 and washers 16 and 16a is deemed desirable.

The end seal plug 15 must be made of a suitable low loss material which can be adapted for any size line for constant characteristic impedance and is not easily subject to breakage. For various particular applications, rubber, synthetic rubber, Teflon, polyethylene, vinyl compounds, Saran, cellulose acetate and the like may be used in accordance with their electrical properties with respect to the application. The insulating plug may be machined, molded or otherwise fabricated in order to conform to the concept of this invention, for example, the plug might be molded directly to the inner conductor with the annular groove at the top edge of the plug.

Figure 2 illustrates a cross sectional view of a modified plug 15 having a flanged portion 20 which is forced into a tight sealing relation with the wall of outer conductor 10 by the gas pressure within the unit. The structure provides further assurance of gas tightness by utilizing the pressure that tends ordinarily to create the leakage problem.

Although the invention has been described with reference to particular embodiments, it will be understood to those skilled in the art that the invention is capable of a variety of alternative embodiments within the spirit and scope of the appended claims.

We claim:

1. A constant impedance end seal for a pressurizable high frequency transmission line of the type having a continuous tubular outer conductor having substantially the same circular cross-section throughout its length and a coaxially disposed inner conductor, which terminates at a point within said outer conductor comprising an extension of said inner conductor threadably affixed thereto, a resilient insulating plug disposed around said extension and partially within said outer conductor, an annular groove in the outer periphery of said plug, a crimped edge portion of said outer conductor being disposed in said groove, and means on said extension for expanding said plug in a pressure sealing relationship with said inner conductor and said outer conductor, said means comprising a shoulder on said extension for engagement with a portion of said plug within said outer conductor and means on said extension for applying a force to said plug against said shoulder for expanding said plug.

2. A device in accordance with claim 1 wherein said plug has an annular flange on its outer periphery at the extremity within said transmission line such that a pressurization within said transmission line tends to force said flange into a sealing relationship with said outer conductor.

(References on following page)

References Cited in the file of this patent

UNITED STATES PATENTS

| | | |
|---|---|---|
| Re. 23,679 | Charbonneau | July 7, 1953 |
| 990,234 | Davis | Apr. 25, 1911 |
| 1,491,325 | Thomas | Apr. 22, 1924 |
| 1,603,991 | Smithers | Oct. 19, 1926 |
| 1,730,377 | Northrup | Oct. 8, 1929 |
| 1,850,040 | Turner | Mar. 15, 1932 |
| 1,851,940 | Williams | Mar. 29, 1932 |
| 2,123,061 | Paache | July 5, 1938 |
| 2,310,351 | Bowan | Feb. 9, 1943 |
| 2,322,233 | Granger | June 22, 1943 |
| 2,357,591 | Kleinfelder | Sept. 5, 1944 |
| 2,514,911 | Tatum | July 11, 1950 |
| 2,545,945 | Ensign | Mar. 20, 1951 |
| 2,831,047 | Wadey | Apr. 15, 1958 |

FOREIGN PATENTS

| | | |
|---|---|---|
| 955,213 | France | June 27, 1949 |